US009009246B1

(12) United States Patent
Reeves (10) Patent No.: US 9,009,246 B1
(45) Date of Patent: Apr. 14, 2015

(54) SYSTEM AND METHOD FOR CONFIGURING AND DISPLAYING COMMUNICATIONS BETWEEN USERS IN AN ORGANIZATION (71) Applicant: Tad Associates, New York, NY (US)

(72) Inventor: Jonathon Reeves, Aquebogue, NY (US)

(73) Assignee: Tad Associates, New York, NY (US)

( * ) Notice: Subject to any disclaimer, the term of this patent is extended or adjusted under 35 U.S.C. 154(b) by 0 days.

(21) Appl. No.: 14/085,269

(22) Filed: Nov. 20, 2013

(51) Int. Cl.
*G06F 15/16* (2006.01)
*H04L 12/58* (2006.01)

(52) U.S. Cl.
CPC ...................................... *H04L 51/26* (2013.01)

(58) Field of Classification Search
None
See application file for complete search history.

(56) References Cited

U.S. PATENT DOCUMENTS

| | | | |
|---|---|---|---|
| 6,621,508 B1 * | 9/2003 | Shiraishi et al. | 715/810 |
| 7,428,579 B2 | 9/2008 | Libbey, IV et al. | |
| 7,529,804 B1 | 5/2009 | Lu et al. | |
| 7,739,614 B1 | 6/2010 | Hackworth | |
| 8,090,787 B2 | 1/2012 | Polis et al. | |
| 8,171,426 B2 | 5/2012 | Loverin et al. | |
| 8,255,923 B2 | 8/2012 | Youel et al. | |
| 8,350,919 B2 * | 1/2013 | Schindler | 348/220.1 |
| 2005/0015451 A1 | 1/2005 | Sheldon et al. | |
| 2005/0027779 A1 | 2/2005 | Schinner | |
| 2006/0173961 A1 | 8/2006 | Turski et al. | |
| 2007/0285390 A1 * | 12/2007 | Yee et al. | 345/163 |
| 2009/0265435 A1 * | 10/2009 | Chen et al. | 709/206 |
| 2010/0102122 A1 | 4/2010 | Skowronek | |
| 2010/0185665 A1 | 7/2010 | Horn et al. | |
| 2010/0198921 A1 | 8/2010 | Choi et al. | |
| 2013/0283335 A1 * | 10/2013 | Lakshminarayanan et al. | 726/1 |
| 2013/0337917 A1 * | 12/2013 | Baugus et al. | 463/40 |

FOREIGN PATENT DOCUMENTS

EP    1603066 A1    12/2005

* cited by examiner

*Primary Examiner* — John B Walsh
(74) *Attorney, Agent, or Firm* — Marshall, Gerstein & Borun LLP (57) ABSTRACT

The method and system may be used to configure communications between users within an organization and displays the communications specific to the organization on a secondary device. An administrator interface module receives a selection of one or more users within the organization as recipients of a message. The message is transmitted to a module that determines whether the received message includes communications specific to the organization, and if so, the intelligent communication module causing the message to be routed to a secondary device for display via a private communication network and not be routed to the primary device. However, if the message is determined to not include communications specific to the organization, the intelligent communication module causing the message to be routed to the primary device via the private communication network.

19 Claims, 8 Drawing Sheets

SYSTEM AND METHOD FOR CONFIGURING AND DISPLAYING COMMUNICATIONS BETWEEN USERS IN AN ORGANIZATION

FIELD OF THE DISCLOSURE

The present disclosure relates to electronic communications and, more particularly, to configuring electronic communications between users in an organization.

BACKGROUND

In today's workplace, many office workers are inundated daily with many different types of electronic messages or electronic communications, such as email, digitized voicemail, instant messages, texts, calendar invites, etc. The number and frequency of these received electronic messages continue to grow exponentially and are increasingly distracting office workers from concentrating on their work. Over time, these distractions begin affecting an office worker's overall productivity and thereby the financials of the office worker's employer. For example, most office workers use only a single computing device, both to perform their work tasks and to receive work-related messages. The dual functionality of this singular computing device poses an obstacle to an office worker. While performing work tasks, the office worker is regularly interrupted by electronic messages. Furthermore, incoming messages are generally accompanied with a notification window that is prioritized over other currently running applications.

Furthermore, an office worker may receive electronic communications via numerous and different interfaces, such as a mail client application, an instant message client application, an internet video interface client application, etc. In attempting to simultaneously run multiple client applications that all receive different types of messages, a worker may struggle with a display that is cluttered with too many windows for the screen's limited real estate.

Additionally, an office worker may receive a work-related message at one or more different devices, such as a mobile phone, a desktop computer, or a tablet, etc. Receiving multiple notifications for the same message across these multiple devices may further distract the office worker in that each device has its own inherent program(s) and window(s) to cause distraction. In addition to keeping track of multiple communication client applications and devices, the office worker must manage all incoming messages by manually filtering or prioritizing the incoming messages. It is time consuming and cumbersome for the user to manually manage all incoming messages.

DETAILED DESCRIPTION

Generally, a communication system configures communications between users within an organization and displays the communications specific to the organization on a secondary device. This secondary device may be a dedicated device or a permanent device that may be located at each user's desk or workspace. Moreover, the secondary device enables an administrator to efficiently deliver tailored content to an individual user, a group of users, an entire office of users, all users organization-wide, or any other suitable grouping of users desired.

In any event, an administrator interface module receives a selection of one or more users within the organization as recipients of a message. The administrator module in turn causes the message to be transmitted to an intelligent communication module within a communication server. The intelligent communication module determines whether the received message includes communications specific to the organization, and if so, the intelligent communication module causing the message to be routed to a secondary device for display via a private communication network and not be routed to the primary device. However, if the message is determined to not include communications specific to the organization, the intelligent communication module causing the message to be routed to the primary device via the private communication network. Alternatively, the administrator module may cause the message to be transmitted directly to a dedicated communication module within the secondary device, and the dedicated communication module determines the routing of the message based on whether the message includes communications specific to the organization.

This technique is discussed in more detail below with reference to FIGS. 1-8. In particular, an example system in which one or more communication modules may configure communications between users within an organization is described with reference to FIG. 1, an illustration showing an example workstation which includes a primary display and a secondary device is discussed with reference to FIG. 2, example screenshots illustrating different types of user interfaces of a secondary device is discussed with reference to FIGS. 3-5, an example screenshot illustrating an administrator interface is discussed with reference to FIG. 6, and example methods which the one or more communication modules may implement to configure communications between users within an organization are discussed with reference to FIGS. 7 and 8.

Figure 1:
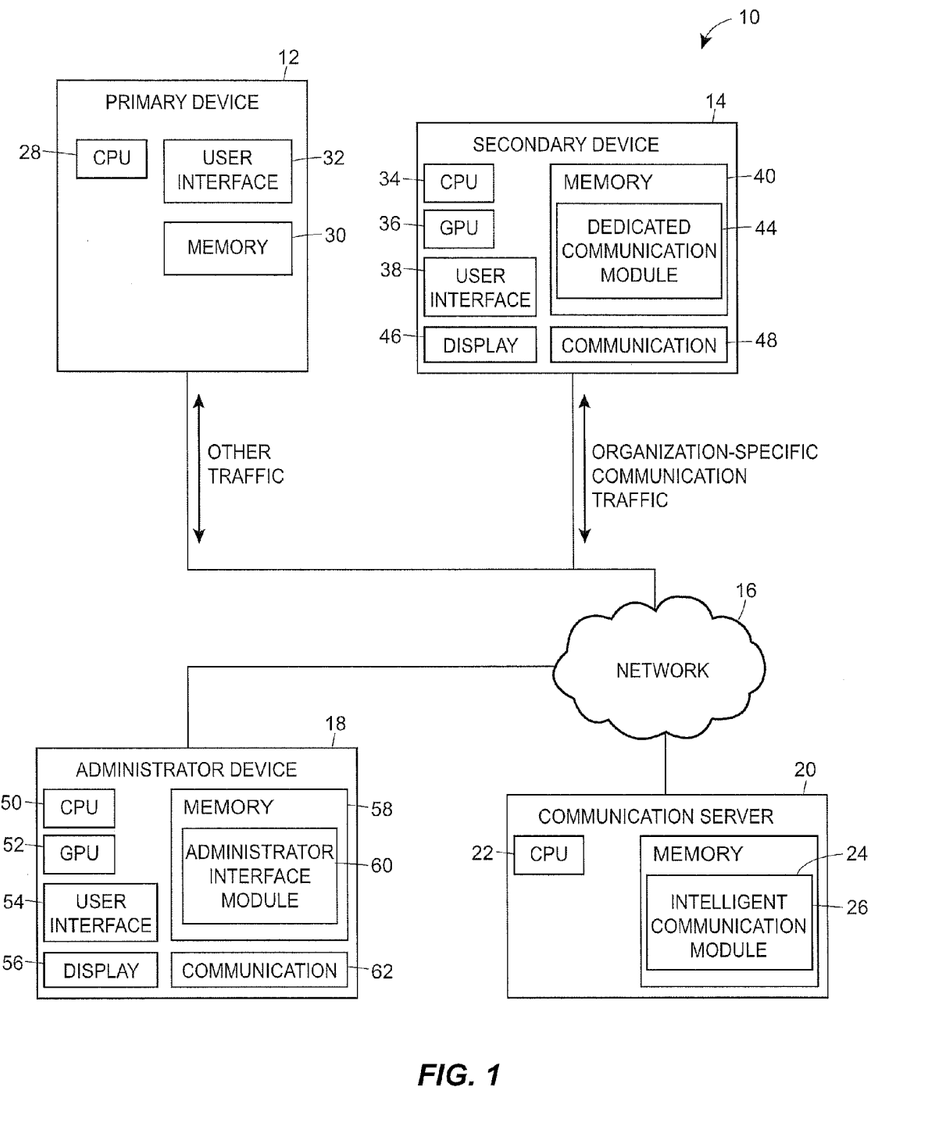
FIG. 1 is a block diagram of an example system in which techniques for configuring communications between users in an organization are implemented.

Referring first to FIG. 1, a communication system 10 includes a primary device 12, a secondary device 14, a communication server 20, and an administrator device 18 that each may be connected to each other via any hardwired or wireless digital communication network 16, including for example a hardwired or wireless local area network (LAN), metropolitan area network (MAN) or wide area network (WAN), the Internet, or any combination thereof. The primary device 12 may be, for example, a general-purpose computer, such as a laptop, a desktop, or other suitable type of computer that may be running a standard operating system such as Windows or OS X, for example. On the other hand, the secondary device 14 may be a special-purpose computing device (e.g., a tablet, a mobile device, etc.) configured to a particular set of tasks related to receiving and delivering communications within an organization. For purposes of this discussion, an "organization" may include a business entity that employs a plurality of users, a nonprofit organization, medical groups, educational organizations, etc.

The primary device 12, the secondary device 14, the communication server 20, and the administrator device 18 may be communicatively connected to each other via any suitable communication system, such as any publically available and/or privately owned communication network, including those that use hardwired based communication structure, such as telephone and cable hardware, and/or wireless communication structure, such as wireless communication networks, including for example, wireless LANs and WANs, satellite and cellular phone communication systems, etc.

In the embodiment illustrated in FIG. 1, the primary device 12 may includes a CPU 28, a memory 30, and a user interface 32. The secondary device 14 may include a CPU 34, a graphics processing unit (GPU) 36, a computer-readable memory 40, a display 46, a communication module 48, and a user interface 38 including a touch interface (not shown). In various implementations, the touch interface can include a touchpad over which the user moves her fingers while looking at a separately provided screen, a touchscreen where the user places her fingers directly over the image being manipulated or over a displayed control being activated (e.g. a displayed keyboard), etc. The user-input device (not shown) may include a "soft" keyboard that is displayed on the display 46 of the secondary device 14, an external hardware keyboard communicating via a wired or a wireless connection (e.g., a Bluetooth keyboard), an external mouse, or any other suitable user-input device. The memory 24 is a computer-readable non-transitory storage device that may include both persistent (e.g., a hard disk) and non-persistent (e.g., RAM) memory components, stores instructions executable on the CPU 34 and/or the GPU 36 that make up a dedicated communication module 44. The dedicated communication module 44, for example, may display communications specific to the organization to the user via a communication user interface.

Referring still to FIG. 1, the communication server 20 is a separate device from the primary device 12, the secondary device 14, and the administrator device 18 and includes a central processing unit (CPU) 22 and a computer-readable memory 24. The memory 24 is a computer-readable non-transitory storage device that may include both persistent (e.g., a hard disk) and non-persistent (e.g., RAM) memory components, stores instructions executable on the CPU 22 that make up an intelligent communication module 26. The intelligent communication module 26 according to various implementations operates as a router for processing and determining one or more recipients or destinations for received communications.

These communications may include electronic mail (i.e., email), a text, digitized voice/voicemail, voice over IP (i.e., VoIP) for video conferencing, a video message, an instant message, a digital calendar event or invite, contact information, a task or to-do item, an electronic sticky note, etc. Moreover, the communications or communication data include electronic digital data that may be stored on a computer readable medium and may be formatted in ASCII, Unicode, or any other encoding scheme. Furthermore, the data may encode audio data, video data, or any other type of data that may be digital data and stored on a computer readable medium.

The administrator device 18 may include a CPU 50, a GPU 52, a computer-readable memory 58, a display 56, a communication module 62, and a user interface 54 including a touch interface (not shown). In various implementations, the touch interface can include a touchpad over which the user moves her fingers while looking at a separately provided screen, a touchscreen where the user places her fingers directly over the image being manipulated or over a displayed control being activated (e.g. a displayed keyboard), etc. The user-input device (not shown) may include a "soft" keyboard that is displayed on the display 56 of the administrator device 18, an external hardware keyboard communicating via a wired or a wireless connection, an external mouse, or any other suitable user-input device. The memory 58 is a computer-readable non-transitory storage device that may include both persistent and non-persistent memory components, stores instructions executable on the CPU 50 and/or the GPU 52 that make up an administrator interface module 60. For example, the administrator interface module 60 may display an administration interface for configuring communication between users within an organization.

In an example scenario, the communication server 20 receives electronic communication data from the administrator device 18. In response, the communication server 20 provides the received communication data to the intelligent communication module 26 for processing and routing. In this scenario, the intelligent communication module 26 determines an intended recipient for the message based on the communication data but any method of recipient determination may be used. Generally, the intelligent communication module 26 determines the intended recipient from the received communication data and routes the communication data accordingly. Additionally, the intelligent communication module 26 may determine the type of data associated with the received communication data.

For example, the intelligent communication module 26 may only route received communication data that is specific to the organization to the secondary device 14 and communication data that is not specific to the organization to the primary device 12. As another example, the intelligent communication module 26 may only route communication data specific to the organization to secondary device 14 in the absence of any file attachments associated with the communication. Otherwise, the intelligent communication module 26 may route all messages with one or more file attachments, even if the communication data is specific to the organization, to the primary device 12. Furthermore, the intelligent communication module 26, or any other module, may assign a level of priority to the data and then route the data to secondary device 14 in accordance to the assigned level of priority. Of course, the intelligent communication module 26 may be disposed within the memory 58 of the administrator device 18.

For simplicity, FIG. 1 illustrates the communication server 20 as only one instance of a server device. However, the communication server 20, according to some implementations, may alternatively consist of a group of one or more communication servers, each equipped with one or more processors and capable of operating independently of the other communication servers. Communication servers operating in such a group can process requests from the administrator device 18 individually (e.g., based on availability), in a distributed manner where one operation associated with processing a request is performed on one communication server while another operation associated with processing the same request is performed on another communication server, or according to any other suitable technique. Furthermore, the communication server 20 according to various implementations operates as a standalone server device, a cloud-based server device, or a server device disposed within the primary device 12, administrator device 18, etc. For the purposes of this discussion, the term "communication server" may refer to an individual communication server, to a group of two or more communication servers, or to a cloud-based server.

Figure 2:
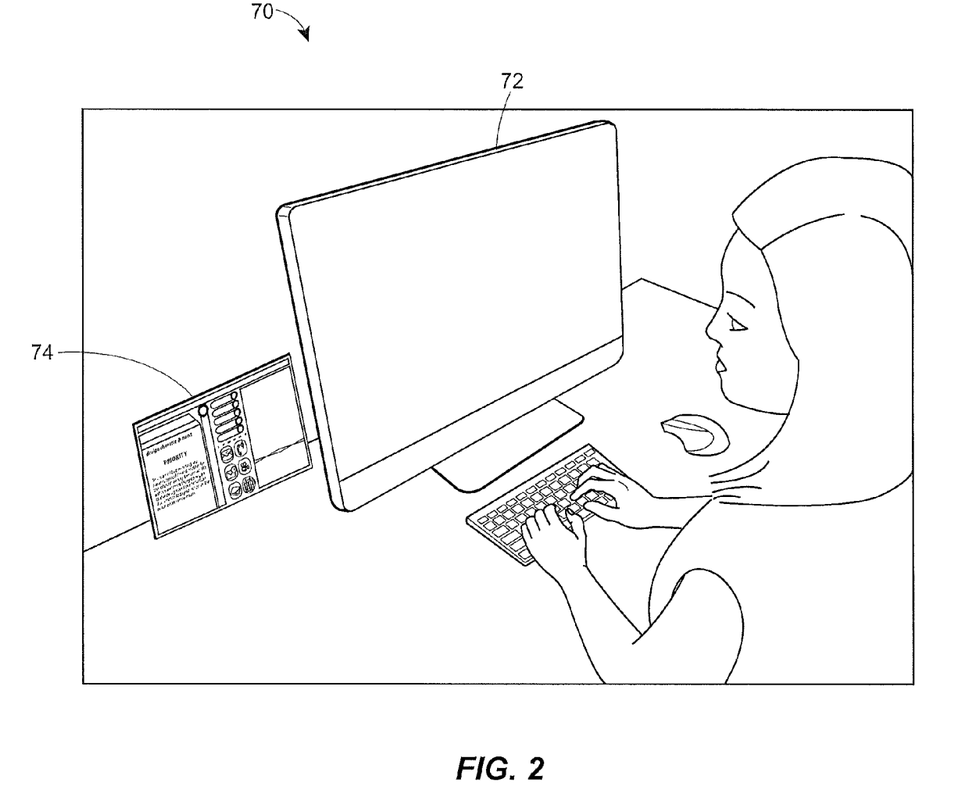
FIG. 2 is an illustration that shows an example workstation which includes a primary display and a secondary device.

For additional clarity, FIG. 2 shows an illustration 70 of an example workstation which includes an example primary display 72 and an example secondary device 74. In this example, the communication system routes all data that includes communication specific to the organization to the example secondary device 74 and all data that does not include communications specific to the organization to the primary device 72. As shown in FIG. 2, for example, a user predominantly performs her work on the example primary device 72 and only receives data that does not include communications that are specific to the organization. Moreover, the user, in this example, manages incoming data that does include communications that are specific to the organization via the example secondary device 74. As result, the user may run less, if any at all, communication client applications on the primary device 72 because the secondary device 74 receives the majority of the communications in this example. As a result, the user benefits from having increased screen real estate while working on the primary device 72. Furthermore, if the user possesses multiple devices (e.g., a landline telephone, a mobile phone, a tablet, a laptop, etc.) that all simultaneously receive data, the user may save time in not having to operate each device separately because the secondary device 74 receives all data.

Furthermore, the secondary device 74 may attach or be affixed to a mounting assembly (not shown) that supports and mounts the secondary device 74 to a desk, a table, etc. The mounting assembly may include a support structure that attaches or mounts to the desk, table, etc. and a rotating structure that attaches to the secondary device 74. The secondary device 74 may attach to the rotating structure using any type of mechanical, chemical adhesive, etc. means (e.g., bolts, screws, glue, etc.) The rotating structure of the mounting assembly allows the secondary device 74 to rotate in place about a fixed axis while the support structure remains mounted to the desk, table, etc. The rotating structure may lock into different orientations to allow the secondary device to easily be positioned by a user in any type of orientation about the fixed axis (e.g., a landscape orientation, a portrait orientation, etc.)

Moreover, the user may launch or switch to specific application on the secondary device 74 by rotating and positioning the secondary device 74 into particular orientations. For example, the user may rotate the secondary device 74 into a vertical, portrait orientation to launch a video conferencing tool, videophone, telephone, video messaging, video broadcasting, etc. to display digitized video data via a video interface application. In response to detecting the portrait orientation of the secondary device 74, the dedicated communication module 44 may display the particular one or more applications that correspond to the portrait orientation. Likewise, when a user rotates the secondary device 74 to the landscape orientation, for example, a communication user interface or any other application may be enabled or launched.

Figure 3:
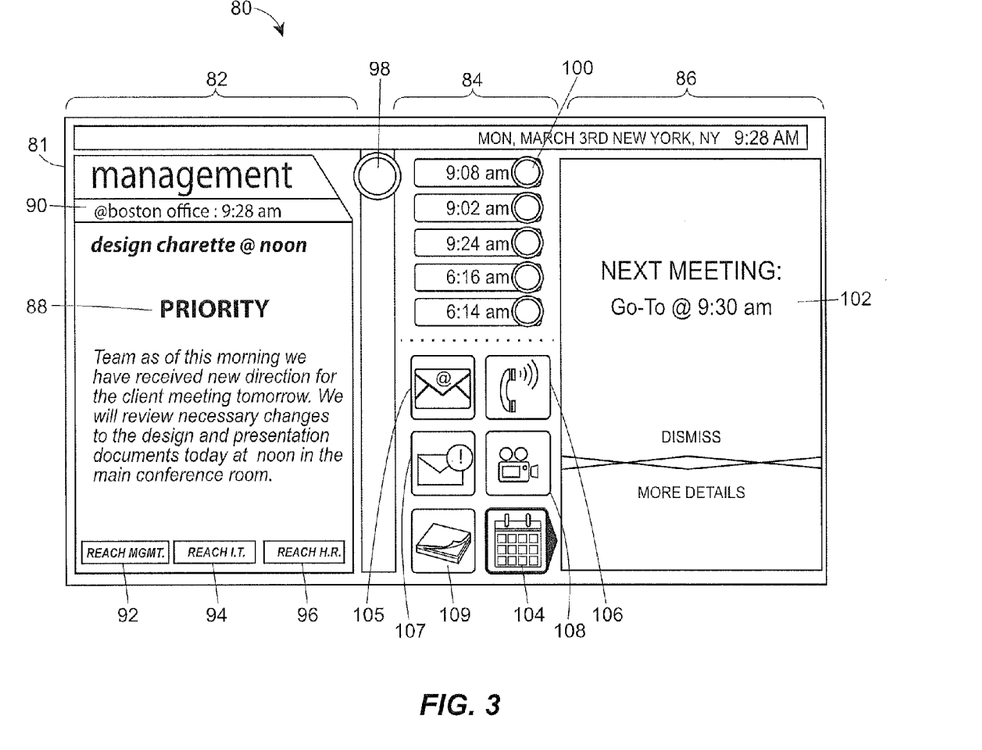
FIG. 3 is an example screenshot that illustrates the display of a communication user interface on a secondary device.

Now referring to FIG. 3, an example screenshot 80 illustrates a communication user interface 81 as shown on a secondary device 14, for example. This example screenshot 80 of the communication user interface 81 may also appear, for instance, on the secondary device 74 as shown in FIG. 2. The communication user interface 81 may include, for instance, a communication interface 82, a utility bar 84, a productivity interface 86, a feedback slider 98, a telephony interface (not shown), a third-party meeting interface (not shown), etc. The dedicated communication module 44 of the second device 14 may display a received communication message to the user via the communication interface 82.

For example, the communication interface 82 may include text of a received message 88, a department and a location 90 associated with the organization of the sender of the message, and easily accessible help flags or buttons 92-96 that when activated, may connect the user with the department corresponding to the button activated. A user may receive an intra-organization communication from another user within one of the various departments within the organization, such as a management department, a human resources (HR) department, an information technology (IT) department, a healthcare department, etc. The dedicated communication module 44 may use an identifier from the data to indicate to the user the various departments, for example, by different colors, different shadings, etc. to clearly distinguish the particular department with which the message is associated. Similarly, the dedicated communication module 44 may use an identifier to indicate the location or office with which the message is associated. After a message has been reviewed, the user may acknowledge the message by sliding, or otherwise activating, the feedback slider 98 as shown in FIG. 3.

This acknowledgement of the message, via the feedback slider 98, may cause the dedicated communication module 44 to update a message log 100 that appears in the utility bar 84. The message log 100 records one or more messages that have been acknowledged in the past. For example, as shown in FIG. 3, the most recently acknowledged message appears at the top of the message log 100 and is time stamped at "9:08 AM." If the user acknowledges the currently displayed message within the communication interface 82, for instance, the message would disappear from the communication interface 82, and a new acknowledged message would appear at the top of the message log 100 with a new time stamp of "9:28 AM" (i.e., the current time as shown in the upper right corner of the communication user interface 81.) The user may select an entry within the message log 100 to review a previously acknowledged message.

Figure 4:
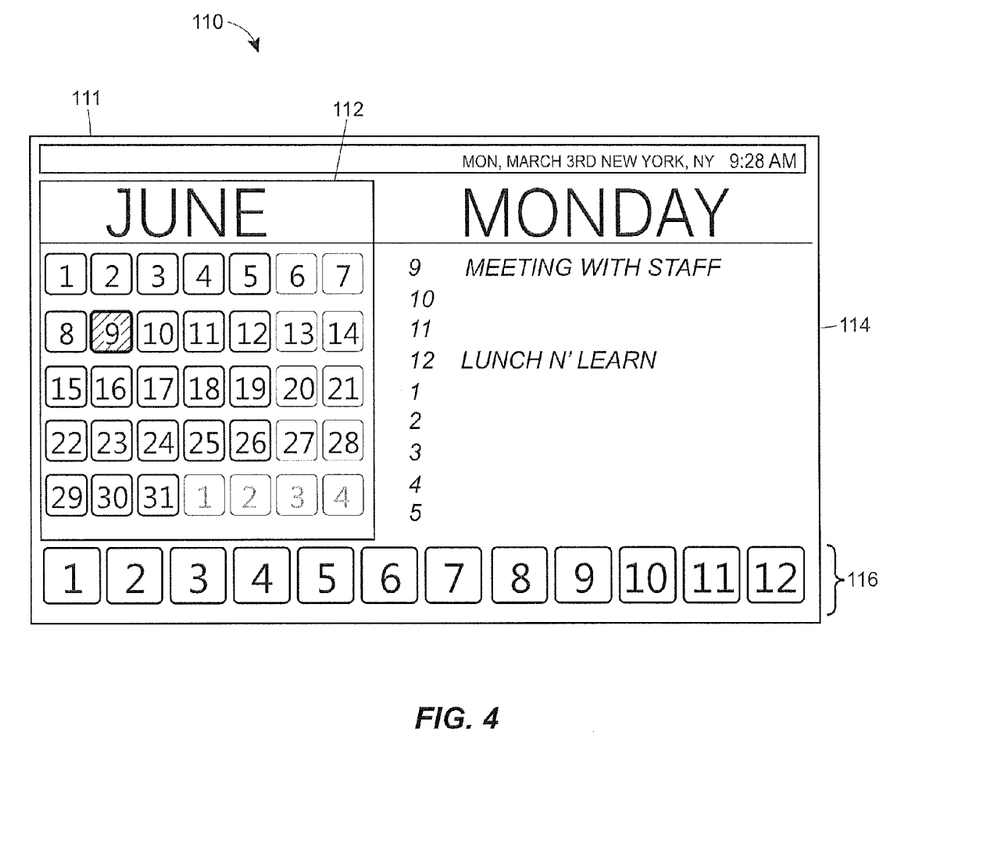
FIG. 4 is an example screenshot that illustrates the display of a calendar user interface on a secondary device.

Still referring to FIG. 3, the utility bar 84 may also include one or more utility icons 104-109, for example, that allows the user to select a particular type of communication or productivity information to view that is associated with one of the utility icons 104-109. For example, as shown in FIG. 3, the calendar icon 104 is associated with a calendar event that displays an upcoming meeting appointment 102. The user may dismiss, via the productivity interface 86, the upcoming meeting appointment 102 by selecting the "Dismiss" icon. Additionally, the user may select the upcoming meeting appointment 102 to cause the dedicated communication module 44 to display a more detailed view of the user's calendar, as shown in FIG. 4. Another utility icon within the utility bar 84 may include an electronic message icon 105 that allows the user to view received emails, texts, instant messages, etc. when selected. Furthermore, the electronic message icon 105 may allow the use to draft emails, texts, instant messages, etc. as well. A telephone icon 106 allows the user to make and receives telephone calls via the secondary device. Similarly, a video phone icon 108 allow the user to answer or to make a video call, participate in a video conference, or receive a video broadcast. A notification icon 107 may notify the user when one or more types of messages are available for the user. These messages may be email, text, voicemail, video message, or any other type of digital message. The task icon 109 may allow the user to view upcoming tasks for the user to complete. These tasks may be received from another party or may from the user inputting the task herself.

Now referring to FIG. 4, an example screenshot 110 illustrates a calendar user interface 111 as shown on a secondary device 14, for instance. In this example, the calendar user interface 111 may include a graphical depiction of a calendar 112 that displays one month at a time. Of course, the calendar user interface 111 may also display one day, one week, one year or any other period of time to the user. The user may toggle between these time periods by selecting a particular day on the graphical depiction of the calendar 112 or may select a particular year icon (not shown.) As another example, each month of the year may be selected by a user via the month selector icons 116. A detailed view for a selected day 114 allows the user to view one or more appointments. The appointments may be user created or may be received as part of an intra-organization communication. The dedicated communication module 44 may also display a view of the user's task list.

Figure 5:
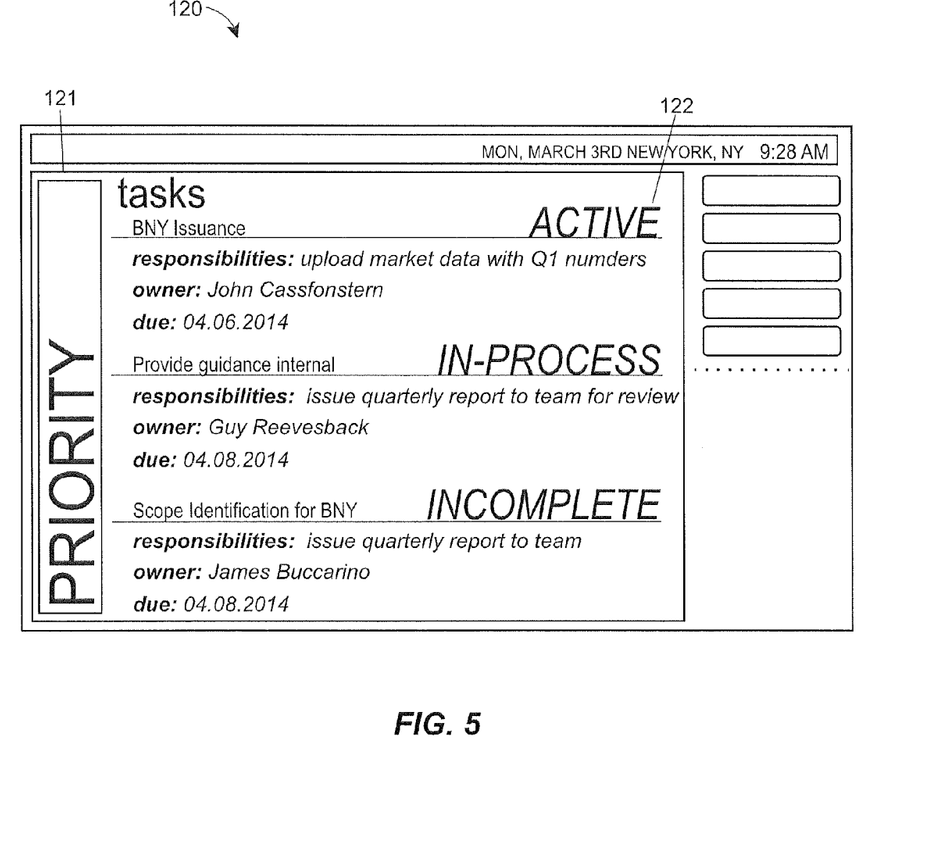
FIG. 5 is an example screenshot that illustrates the display of a task management user interface on a secondary device.

FIG. 5 illustrates an example screenshot 120 of a task management user interface 121 as displayed on a secondary device 14. The task management user interface 121 includes a priority task display 122 that displays the user's tasks in a list, for example. These tasks may be user created or may be received as a communication specific to the organization. Furthermore, the dedicated communication module 44 may group the tasks by a priority level and may identify the priority levels with different types of indicators, such as different colors, different shading, etc. In addition to the examples illustrated in FIGS. 3 and 4, the dedicated communication module 44 may display any other type of the user interface 121, such as a person-to-person messaging user interface, a contact user interface, a consolidated mail user interface, a promotional user interface, a "sticky note" user interface that allows a user to leave a digital note at a coworker's desk, etc. Other types of user interfaces may include a unit converter, an alarm clock, a note pad, a calculator, a dictionary, etc.

Figure 6:
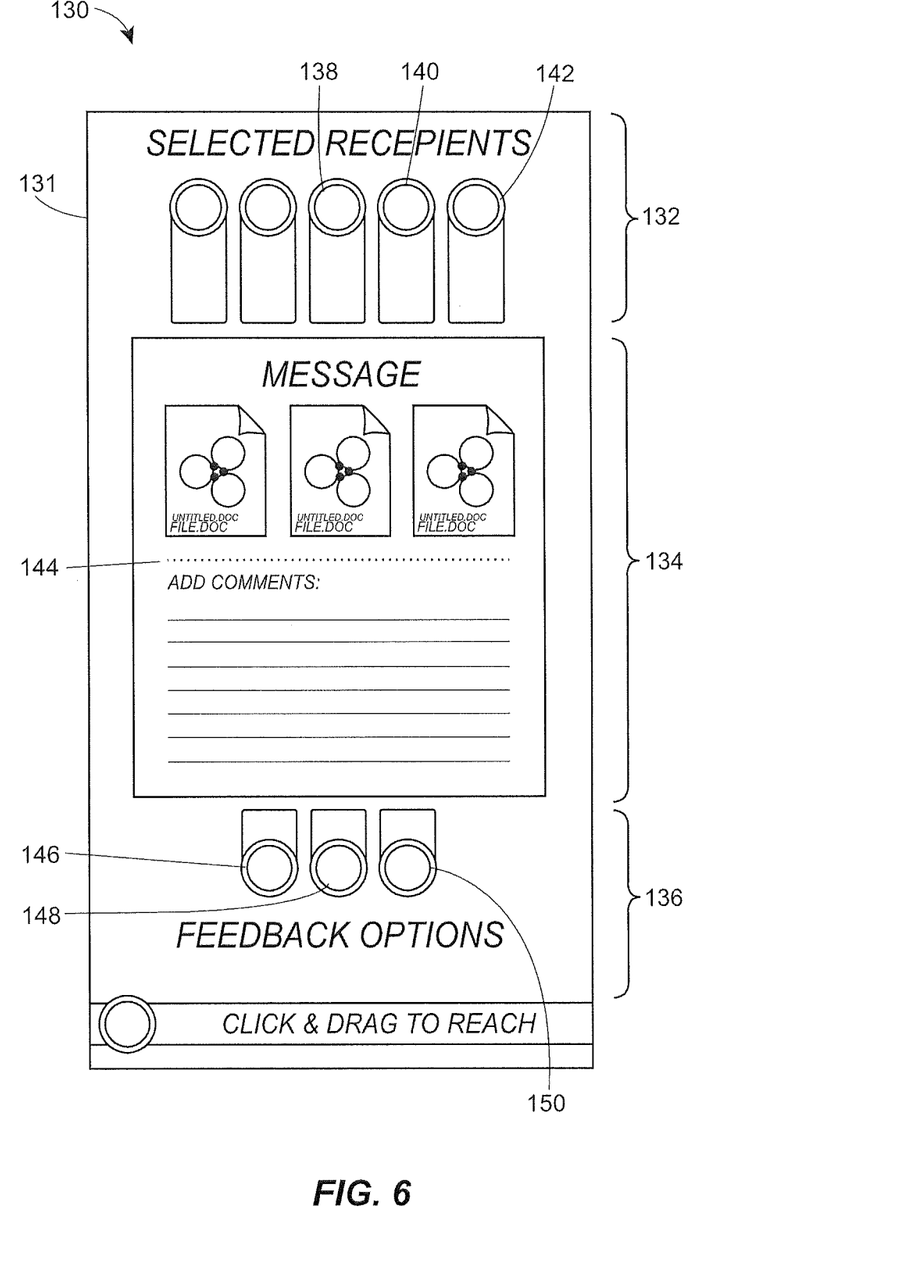
FIG. 6 is an example screenshot that illustrates the display of an administrator interface on an administrator device.

While the dedicated communication module 44 of the secondary device 14 may allow for the display of received communications, the administrator interface module 60 of the administrator device 18 allows an administrator or another user associated with the organization to create and send a communication to one or more users associated with the organization. Referring now to FIG. 6, an example screenshot 130 illustrates an administrator interface 131 that allows an administrator to create and send an intra-organization message. The administrator interface module 60 may cause the administrator interface 131 to be displayed on the display 56 of the administrator device 18 as an application running on an operating system of a general purpose computer. Moreover, the administrator interface 131 may run as a mobile application on a mobile device, such as a mobile phone, a tablet, etc. The administrator interface 131 may include a recipient interactive control 132, a message interactive control 134, and a feedback interactive control 136.

As an example, an administrator may wish to send a communication to one or more users associated with the organization. The administrator may select one or more recipients within the recipient interactive control 132. A recipient may be defined as only an individual user associated with the organization, a group of users associated with the organization, or every user in the entire organization. As shown in FIG. 6, for example, the administrator may select an individual selector icon 138, a group selector icon 140, or an entire organization-wide selector icon 142. However, the administrator interface module 60 may defined any type of group to appear as one of the selector icons 138-142.

An administrator may next draft the payload (e.g., content, text, etc.) of the message 144 in the message interactive control 134. The content may include multimedia information, such as video, images, sound files, etc. The administrator may enter the content for the message via a wireless keyboard, for instance, or upload a document (e.g., a .pdf, a .doc, etc.) The administrator interface module 60 may temporarily store this administrator-entered content locally until the administrator has completed configuring her communication. The administrator may additionally specify feedback options 146-150 within the feedback setting area 136. The administrator interface module 60 may display to the user any type of feedback requested from the recipient. For example, the administrator may request from the recipient a binary yes/no confirmation, a text reply, a video reply, a dismissed alert, an away-from-desk reply, a task status, an indication of when a message has been viewed, an indication of acceptance of an incoming voice call, an indication of acceptance of incoming video call, etc. After the administrator is satisfied with her selections, the administrator interface module 60 may transmit the message to the recipient. Advantageously, this communication system allows multi-modal messaging options into the one administrator interface 131, provides real-time feedback and status of messages, and generates data for employee analytics.

To further illustrate the techniques for configuring communications between users within an organization, example methods that the dedicated communication module 44 may implement are discussed next with reference to FIGS. 7 and 8. More generally, these methods can be implemented in any suitable computing device and any suitable software application. For example, these methods can be implemented as sets of instructions stored on a computer-readable medium and executable on a processor.

Figure 7:
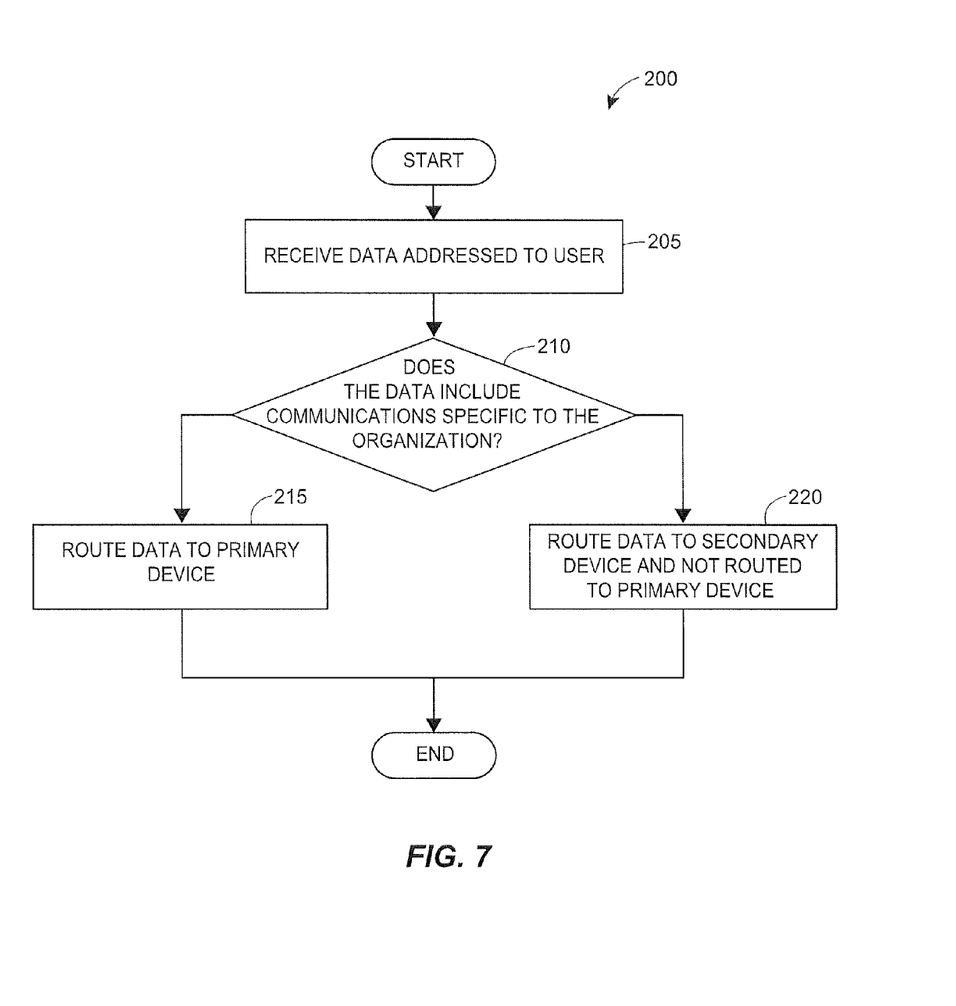
FIG. 7 is a flow diagram of an example method for efficiently presenting data to a user operating a primary device in a private communication network specific to an organization.

The flow diagram of FIG. 7 illustrates an example method 200 for efficiently presenting data to a user operating a primary device in a private communication network specific to an organization. At a block 205, data addressed to a user is received. The data may include information about the intended recipient(s), the sender (i.e., the associated department within the organization and/or location of sender), etc. Furthermore, the data may include not only message data but also streaming data, such as streamed digitized voice data for a telephone, streamed digitized video data (e.g., videophone, video conference meeting, a broadcast video announcement, etc.), or any other type of streamed data. The dedicated communication module 44 or the intelligent communication module 26 may determine whether the data includes communications that are specific to the organization at a block 210. Either the intelligent communication module 26 or the dedicated communication module 44 may use a specific type of data or a marker to determine whether the data includes communications specific to the organization.

If, at the block 210, the data is determined to not include communications that are specific to the organization, then control is transferred to a block 215. At the block 215, the data routed to the primary device 12 for processing. On the other hand, if the data is determined to include communications that are specific to the organization, then control is transferred to a block 220. At the block 220, the data is routed to the secondary device 14 and not routed to the primary device 12.

Figure 8:
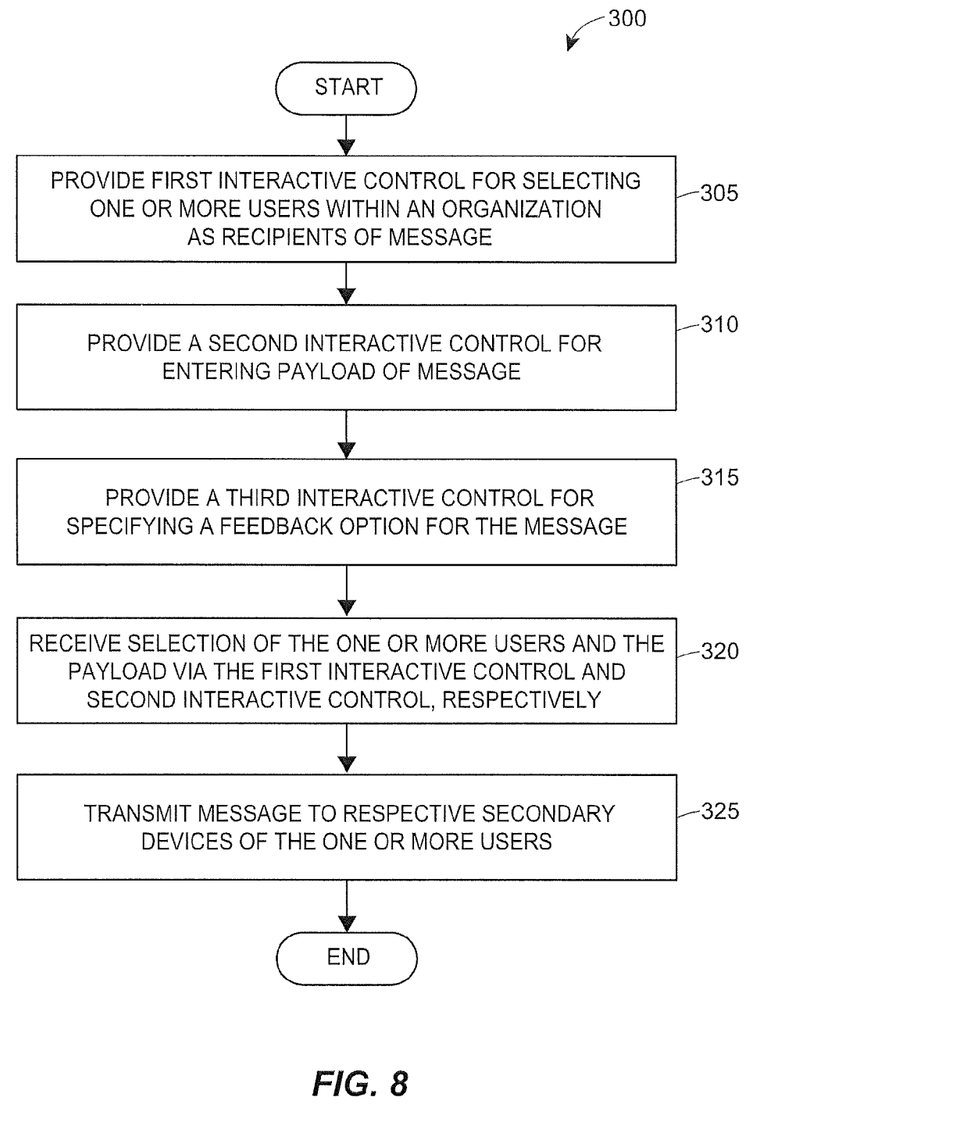
FIG. 8 is a flow diagram of an example method for configuring communications in a communication network of an organization.

FIG. 8 is a flow diagram of an example method for configuring communications in a communication network of an organization. More particularly, a software module may implement the method 300 to allow a user to configure communications between users in an organization. At a block 305, an administrator interface module 60 provides a first interactive control for selecting one or more users within an organization as recipients of a message. The recipient(s) may include an individual user, a group of users, or all users within the organization.

As illustrated in FIG. 6, the administrator interface module 60 allows a user to select the recipients of the message via the recipient interactive control 132. The administrator interface module 60 provides a second interactive control for entering a payload of the message at a block 310. The payload of the message may include not only text, but also (or alternatively) multimedia information, such as video, images, sound files, etc. An example of entering this payload of the message is illustrated in FIG. 6 with allowing a user to enter the payload of the message via the message interactive control 134. At a block 315, the administrator interface module 60 provides a third interactive control for specifying a feedback option for the message. The feedback options may include a binary yes/no confirmation, a text reply, a video reply, a dismissed alert, an away-from-desk reply, etc. The administrator interface module 60 receives a selection of the one or more users and the payload via the first interactive control and second interactive control, respectively, at a block 320. The administrator interface module 60, at a block 325, transmits the message to the secondary devices 14 of the one or more users.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for efficiently presenting data to a user operating a primary device in a private communication network specific to an organization, the method comprising:
   receiving, by one or more computing devices, a first set of data addressed to the user;
   receiving, by the one or more computing devices, a second set of data addressed to the same user address;
   determining, by the one or more computing devices, that the first set of data includes communications specific to the organization and that the second set of data does not include communications specific to the organization;
   causing the second set of data to be routed to the primary device via the private communication network, by the one or more computing devices; and
   causing the first set of data to be routed to a secondary device via the private communication network and not be routed to the primary device, wherein the secondary device is configured to display the communications specific to the organization.

2. The method of claim 1, wherein determining that the first set of data includes communications specific to the organization includes determining whether the first set of data includes one of (i) electronic message, (ii) a digital calendar event, (iii) digitized voice, or (iv) digitized video.

3. The method of claim 1, wherein determining that the first set of data includes communications specific to the organization includes determining whether the first set of data includes data packets addressed (i) individually to the user, (ii) a group of users including the user, or (iii) all users in the organization.

4. The method of claim 1, wherein the organization is a business entity employing a plurality of users including the user.

5. The method of claim 1, further comprising, when the data includes communications specific to the organization:
   assigning a level of priority to the data, and
   causing the data to be routed to the secondary device in accordance with the assigned level of priority.

6. The method of claim 1, wherein determining that the first set of data includes communications specific to the organization includes determining whether the first set of data includes one or more identifiers relating to origination of the data.

7. The method of claim 6, wherein the identifier includes an indication of a location from which the data originated.

8. The method of claim 6, wherein the identifier includes an indication of a department within the organization from which the data originated.

9. The method of claim 8, wherein the department within the organization includes one of (i) a management department, (ii) human resource (HR) department, or (iii) an information technology (IT) department.

10. A non-transitory computer-readable medium storing thereon instructions that implement a software interface for configuring communications to one or more users operating a primary device in a communication network of an organization, wherein the instructions execute on one or more processors to:
   provide, via a user interface of a computing device, a first interactive control for selecting the one or more users within the organization as recipients of a plurality of messages;
   provide, via the user interface of the computing device, a second interactive control for entering a payload of the plurality of messages;
   receive selection of the one or more users and the payload via the first interactive control and second interactive control, respectively;
   cause a first at least one of the plurality of messages to be transmitted via the communication network to respective secondary devices of the one or more users and not be transmitted to respective primary devices of the one or more users, wherein the respective primary devices are general-purpose computers communicatively coupled to the communication network; and
   cause a second at least one of the plurality of messages to be transmitted via the communication network to respective primary devices of the one or more users, wherein the first and second at least ones of the plurality of messages are addressed to the same user address for at least one of the one or more users.

11. The computer-readable medium of claim 10, wherein the instructions execute on the one or more processors to further provide a third interactive control for specifying a feedback option for the plurality of messages.

12. The computer-readable medium of claim 11, wherein the feedback option includes one of (i) a binary yes/no confirmation, (ii) a text reply, (iii) a video reply, (iv) a dismissed alert, (v) a task status, (vi) an indication of when a message has been viewed, (vii) an indication of acceptance of an incoming voice call, (viii) an indication of acceptance of incoming video call, or (ix) an away-from-desk notification.

13. The computer-readable medium of claim 10, wherein the instructions are configured to allow a selection of the one or more recipients from a single user, a group of users, or all users in the organization.

14. The computer-readable medium of claim 10 implemented in a general-purpose computer communicatively coupled to the communication network.

15. The computer-readable medium of claim 10 implemented in a special-purpose messaging device configured to transmit and receive communications within the organization, wherein a user operates the special-purpose messaging device as a secondary device and a general-purpose computer as a primary device.

16. A system for efficiently communicating between users in an organization, wherein at least one user is operating a primary device, the system comprising:
   a general-purpose computing device that operates in a communication network of the organization as a primary device of a user, wherein the general-purpose computing device executes a plurality of software applications;
   a special-purpose computing device including (i) one or more processors, (ii) a user interface, (iii) a network interface, and (iv) a non-transitory computer-readable memory, wherein the special-purpose computing device operates in the communication network of the organization as a secondary device of the user to receive and transmit communications specific to the organization;
   the special-purpose computing device configured to display the communications specific to the organization via the user interface of the special-purpose computing device to thereby increase screen real estate on the general-purpose computing device available to the plurality of software applications; and
   a router (i) that operates in the communication network of the organization, (ii) that causes data addressed to a user address that includes communications specific to the organization to be routed to the special-purpose computing device, and (iii) that causes data addressed to the same user address that does not include communications specific to the organization to be routed to the general-purpose computing device.

17. The system of claim 16, further comprising:
   an administrative computing device that operates in the communication network of the organization and that transmits communications specific to the organization to the secondary device.

18. The system of claim 16, wherein the user interface of the special-purpose computing device includes one of (i) a communication interface, (ii) a utility bar, (iii) a telephony interface, (iv) a third-party meeting interface, or (v) a productivity interface.

19. The system of claim 16, wherein the specific-purpose computing device is further configured to display digitized video data via a video interface when the special-purpose computing device is detected to be in a portrait orientation.

* * * * *